(12) United States Patent
Connolly

(10) Patent No.: US 12,022,173 B2
(45) Date of Patent: Jun. 25, 2024

(54) INTERNALLY ALIGNED CAMERA AND A MANUFACTURING METHOD THEREOF

(71) Applicant: Connaught Electronics Ltd., County Galway (IE)

(72) Inventor: Eanna Connolly, Tuam (IE)

( * ) Notice: Subject to any disclaimer, the term of this patent is extended or adjusted under 35 U.S.C. 154(b) by 49 days.

(21) Appl. No.: 17/777,720

(22) PCT Filed: Nov. 19, 2020

(86) PCT No.: PCT/EP2020/082633
§ 371 (c)(1),
(2) Date: May 18, 2022

(87) PCT Pub. No.: WO2021/099443
PCT Pub. Date: May 27, 2021

(65) Prior Publication Data
US 2023/0009451 A1    Jan. 12, 2023

(30) Foreign Application Priority Data
Nov. 21, 2019 (DE) .................... 10 2019 131 393.7

(51) Int. Cl.
*H04N 23/51* (2023.01)
*B60R 11/04* (2006.01)
(Continued)

(52) U.S. Cl.
CPC ............ *H04N 23/51* (2023.01); *B60R 11/04* (2013.01); *H04N 23/52* (2023.01); *H04N 23/54* (2023.01); *H04N 23/55* (2023.01); *H04N 23/57* (2023.01)

(58) Field of Classification Search
CPC ........ H04N 23/51; H04N 23/52; H04N 23/54; H04N 23/55; H04N 23/57; H04N 23/50;
(Continued)

(56) References Cited

U.S. PATENT DOCUMENTS

| 8,970,700 B2 | 3/2015 | Inoue et al. |
| 9,565,342 B2 | 2/2017 | Sauer et al. |

(Continued)

FOREIGN PATENT DOCUMENTS

| CN | 102449524 A | 5/2012 |
| CN | 104185413 A | 12/2014 |

(Continued)

OTHER PUBLICATIONS

International Search Report and Written Opinion in corresponding International Application No. PCT/EP2020/082633, dated Dec. 23, 2020 (10 pages).

(Continued)

*Primary Examiner* — Albert H Cutler
(74) *Attorney, Agent, or Firm* — Osha Bergman Watanabe & Burton LLP

(57) ABSTRACT

The invention provides an internally aligned camera device comprising a front housing assembly, a first printed circuit board (PCB), a second PCB and a flexible PCB, a PCB retention cage and a rear housing assembly. The front housing assembly comprises lens elements for forming an image on an image sensor operably coupled to the first PCB, said image sensor optically aligned with said front housing assembly comprising said lens elements. The second PCB is electrically coupled to said first PCB using a flexible PCB, where the second PCB folded over said first circuit board. The PCB retention cage retains the second PCB in position. The rear housing assembly comprises a metal shield which clamps down the second PCB and said PCB retention cage in position. Further, said front housing assembly is centrally aligned and attached with said rear housing assembly. A method of manufacturing the camera device is also described.

17 Claims, 8 Drawing Sheets

(51) Int. Cl.
*H04N 23/52* (2023.01)
*H04N 23/54* (2023.01)
*H04N 23/55* (2023.01)
*H04N 23/57* (2023.01)

(58) Field of Classification Search
CPC .................. H04N 23/555; B60R 11/04; B60R 2300/00–108; G03B 30/00
See application file for complete search history.

(56) References Cited

U.S. PATENT DOCUMENTS

| | | |
|---|---|---|
| 11,412,115 B2* | 8/2022 | Park .................. H04N 23/55 |
| 2013/0044382 A1 | 2/2013 | Phoon et al. |
| 2013/0235259 A1 | 9/2013 | Dharmatilleke |
| 2013/0242099 A1 | 9/2013 | Sauer et al. |
| 2017/0201661 A1 | 7/2017 | Conger |
| 2018/0013935 A1 | 1/2018 | Kunze et al. |
| 2019/0208626 A1* | 7/2019 | Han .......................... G02B 7/02 |
| 2019/0302576 A1* | 10/2019 | Rafalowski ............. B60S 1/026 |
| 2020/0059580 A1* | 2/2020 | Park .......................... B60R 11/04 |

FOREIGN PATENT DOCUMENTS

| | | |
|---|---|---|
| JP | 5821394 B2 | 11/2015 |
| WO | 2019/076869 A1 | 4/2019 |

OTHER PUBLICATIONS

Office Action issued in counterpart Chinese Application No. 202080089120.7, dated Mar. 25, 2024 (12 pages).

* cited by examiner

INTERNALLY ALIGNED CAMERA AND A MANUFACTURING METHOD THEREOF

FIELD

The present disclosure relates to an internally aligned camera. More specifically, the present disclosure relates to an internally aligned camera for a vehicle using a flexible printed circuit board and method of manufacture of said internally aligned camera.

BACKGROUND

The current generation of cameras use an optical alignment process of the lens as the image sensor is fixed to the camera housing along with the printed circuit board on which the image sensor is mounted. This externalises the optical tolerances of the lens and the mechanical tolerances of the housing and printed circuit board assemblies as the lens mechanism of the camera has to be moved to align the image sensor to the lens. The larger positional tolerances of the lens relative to the camera body increases the complexity of the holder which holds the camera. This may also require a large clearance between the camera lens and a surface of the vehicle which in turn has a negative impact on product styling and NVH (Noise Vibration and Harshness) for the manufacturer of the camera or the original equipment manufacturer. Examples of prior art camera systems are disclosed in U.S. Pat. Nos. 9,565,342, 8,970,700 and JP5821394.

Further, laser welding is used to join and seal the lens holder to the rear housing of the camera. And the variation in the overlap of these components has an impact on the quality of the weld joint between the rear housing and the lens holder (as shown in FIG. 1 the rear housing and the lens holder do not overlap and thereby cause a non-reliable joint). Further, laser welding cannot be achieved if there is an overhang of the rear housing (as shown in FIG. 2) and there is a greater risk of this occurring in a camera having multiple printed circuit boards as the tolerance of each printed circuit board stacks up.

Thus there is an unresolved and unfulfilled need for an internally aligned camera, which overcomes the above problems of the art.

SUMMARY

The present invention relates to an internally aligned camera for a vehicle, as set out in the appended claims. More specifically, the present invention relates to an internally aligned camera using a flexible printed circuit board and a printed circuit board retention cage and method of manufacture of said internally aligned camera.

In one embodiment there is provided an internally aligned camera device, comprising a front housing assembly, a first printed circuit board, a second printed circuit board and a flexible printed circuit board, a printed circuit board retention cage and a rear housing assembly.

In one embodiment the front housing assembly comprises a lens elements for forming an image on an image sensor operably coupled to the first printed circuit board, said image sensor optically aligned with said front housing assembly comprising said lens elements, and said first printed circuit board is attached to said front housing assembly by a first fastening means. In an embodiment, the first fastening comprises laser soldering said first printed circuit board with one or more solder studs of said front housing assembly.

In one embodiment the second printed circuit board is electrically coupled to said first printed circuit board using a flexible printed circuit board, wherein said second printed circuit board folded over said first circuit board. The printed circuit board retention cage retains the second printed circuit board in position using one or more retaining clips. Also, the second printed circuit board comprises a leaf spring connector for electrically coupling said second printed circuit board to an external connector on the rear housing assembly.

In one embodiment the rear housing assembly comprises a metal shield comprising one or more spring features, where said one or more spring features clamps down the second printed circuit board and said printed circuit board retention cage in position. Further, said front housing assembly is centrally aligned with said rear housing assembly and where said front housing assembly and said rear housing assembly is attached using a second fastening means. In an embodiment, the second fastening means comprises laser welding.

In an embodiment, said spring features of said metal shield electrically couples said second printed circuit board and said printed circuit board retention cage to said metal shield. Further, the walls of said printed circuit board retention cage encloses said first printed circuit board and said second printed circuit board along the edges of said first printed circuit board and said second printed circuit board.

In another embodiment there is provided a method for manufacturing an internally aligned camera device, comprises the following steps:

optically aligning an image sensor mounted on a first printed circuit board with a front housing assembly comprising lens elements, said first printed circuit board electrically coupled to a second printed circuit board through a flexible printed circuit board;

fastening said first printed circuit board to said front housing assembly using a first fastening means to constrain said first printed circuit board after said optical alignment of said image sensor with said front housing assembly;

placing a printed circuit board retention cage on said front housing assembly;

folding said second printed circuit board over said first printed circuit board and fastening said second printed circuit board to said printed circuit board retention cage using a second fastening means;

soldering a leaf spring connector on said second printed circuit board;

assembling a rear housing assembly with said front housing assembly, said rear housing assembly comprising a metal shield, said metal shield comprising spring features wherein while assembling said spring features of said metal shield clamps down said second printed circuit board and said printed circuit board retention cage in position using said spring features and wherein while assembling said rear housing assembly is centrally aligned with said front housing assembly; and fastening said rear housing assembly with said front housing assembly in said centrally aligned position using a third fastening means.

In one embodiment, said first fastening means comprises laser soldering said first printed circuit board with one or more solder studs of said front housing assembly.

In one embodiment, said second fastening means comprises retaining clips on the printed circuit board retention cage, wherein said retaining clips are released to prevent the second printed circuit board to spring back to the unfolded position.

In one embodiment, said third fastening means comprises laser welding.

In one embodiment the assembling of the rear housing assembly with said front housing assembly electrically couples said leaf spring connector to an external connector on the rear housing assembly.

In one embodiment while assembling said spring features of said metal shield electrically couples said second printed circuit board and said printed circuit board retention cage to said metal shield.

In one embodiment, walls of said printed circuit board retention cage encloses said first printed circuit board along the edges of said first printed circuit board.

The invention will now be described in more detail with reference to a preferred embodiment thereof and also with reference to the accompanying drawings.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

The present invention relates to an internally aligned camera. More specifically, the present invention relates to an internally aligned camera using a flexible printed circuit board and a printed circuit board retention cage and method of manufacture of said internally aligned camera.

Figure 1:
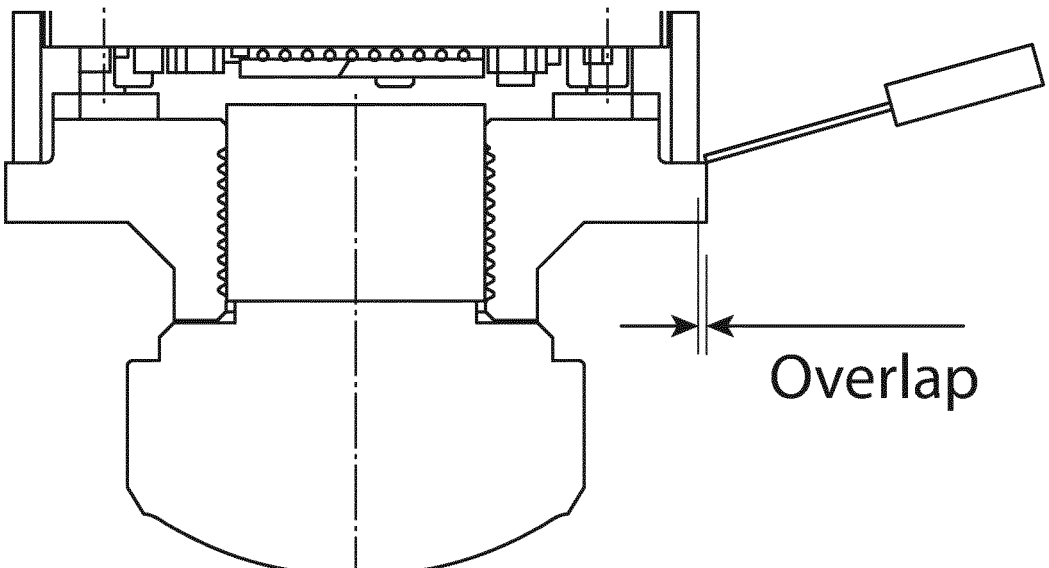
FIG. 1 exemplarily illustrates a sectional view of a camera module as known in the art.
Figure 2:
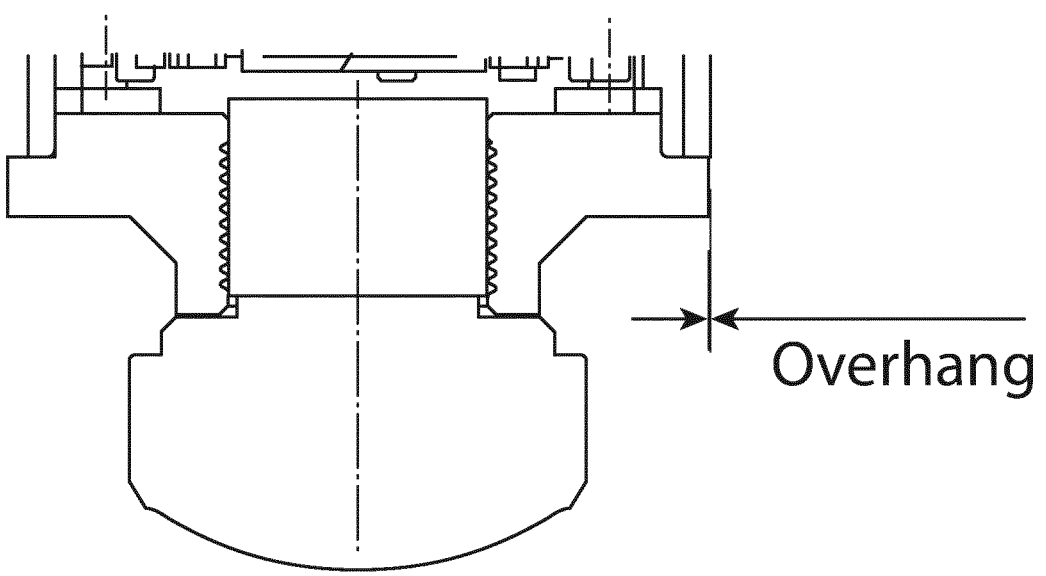
FIG. 2 exemplarily illustrates another sectional view of a camera module as known in the art.
Figure 3:
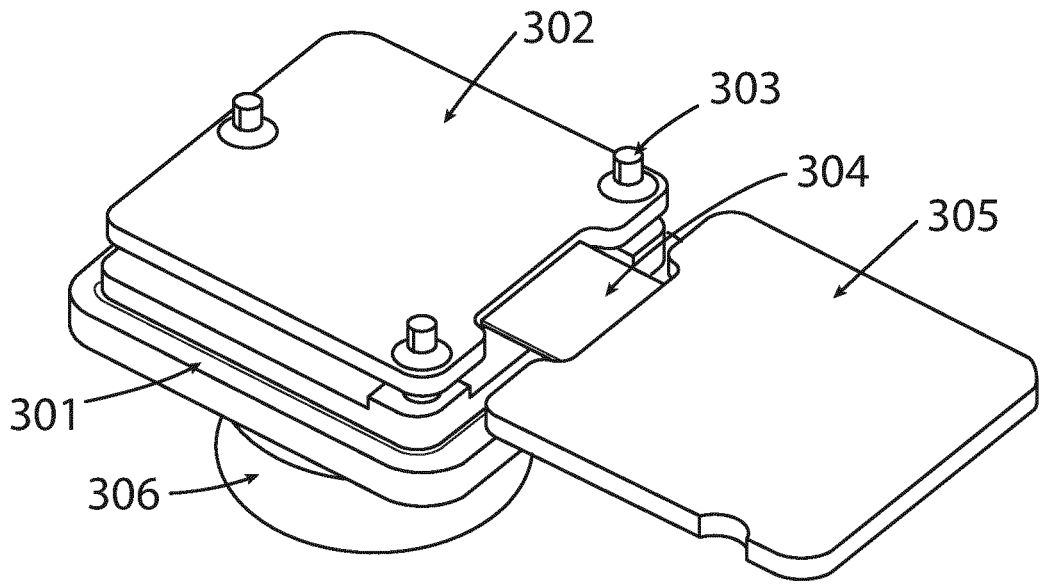
FIG. 3 exemplarily illustrates a perspective view of a first printed circuit board assembled on a front housing assembly of the internally aligned camera in accordance with some of the embodiments of the present invention.

FIG. 3 exemplarily illustrates a perspective view of a first printed circuit board assembled on a front housing assembly of the internally aligned camera in accordance with some of the embodiments of the present invention. As shown in FIG. 3, initially, an image sensor mounted on a first printed circuit board (PCB) 302 is optically aligned with a front housing assembly 301 comprising lens elements 306. The first PCB 302 is electrically coupled to a second PCB 305 through a flexible PCB 304. The first PCB 302 is fastened to said front housing assembly 301 using a first fastening means to constrain said first PCB 302 in an aligned position after said optical alignment of said image sensor with said front housing assembly 301. In an embodiment, said first fastening means comprises laser soldering said first PCB 302 with one or more solder studs 303 of said front housing assembly 301.

Figure 4:
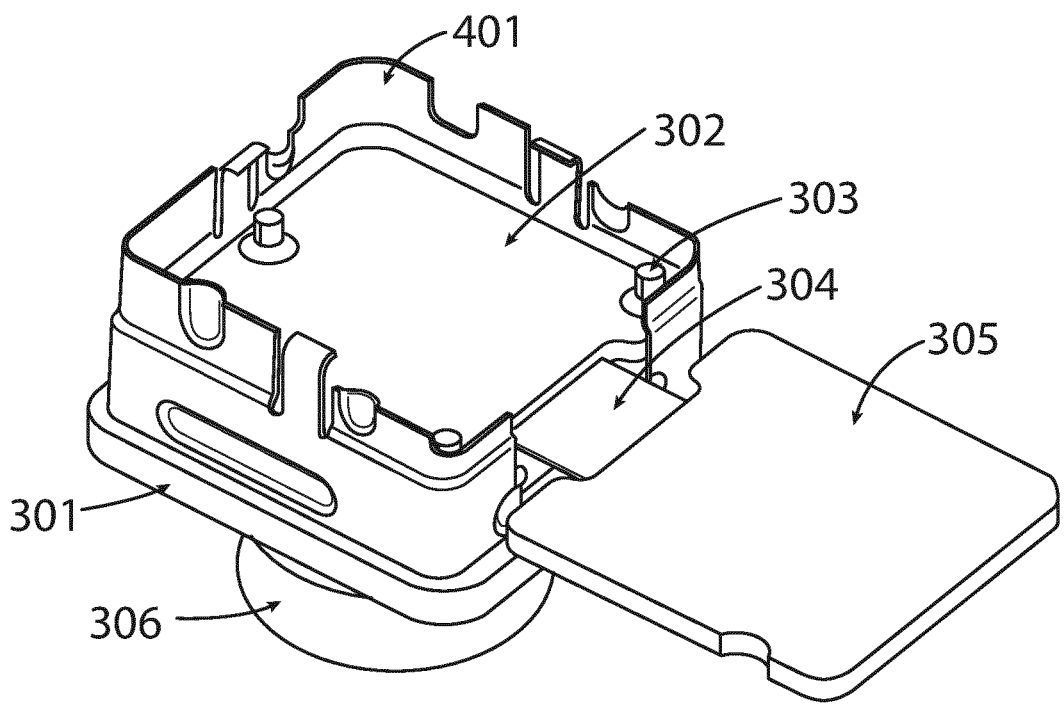
FIG. 4 exemplarily illustrates a perspective view of the first printed circuit board assembled on the front housing assembly with the printed circuit board retention cage of the internally aligned camera in accordance with some of the embodiments of the present invention.

A PCB retention cage 401 is placed on said front housing assembly as shown in FIG. 4. FIG. 4 exemplarily illustrates a perspective view of the first PCB 302 assembled on the front housing assembly 301 with the PCB retention cage 401 of the internally aligned camera in accordance with some of the embodiments of the present invention. The walls of said PCB retention cage 401 encloses said first PCB 302 along the edges of said first PCB 302.

Figure 5:
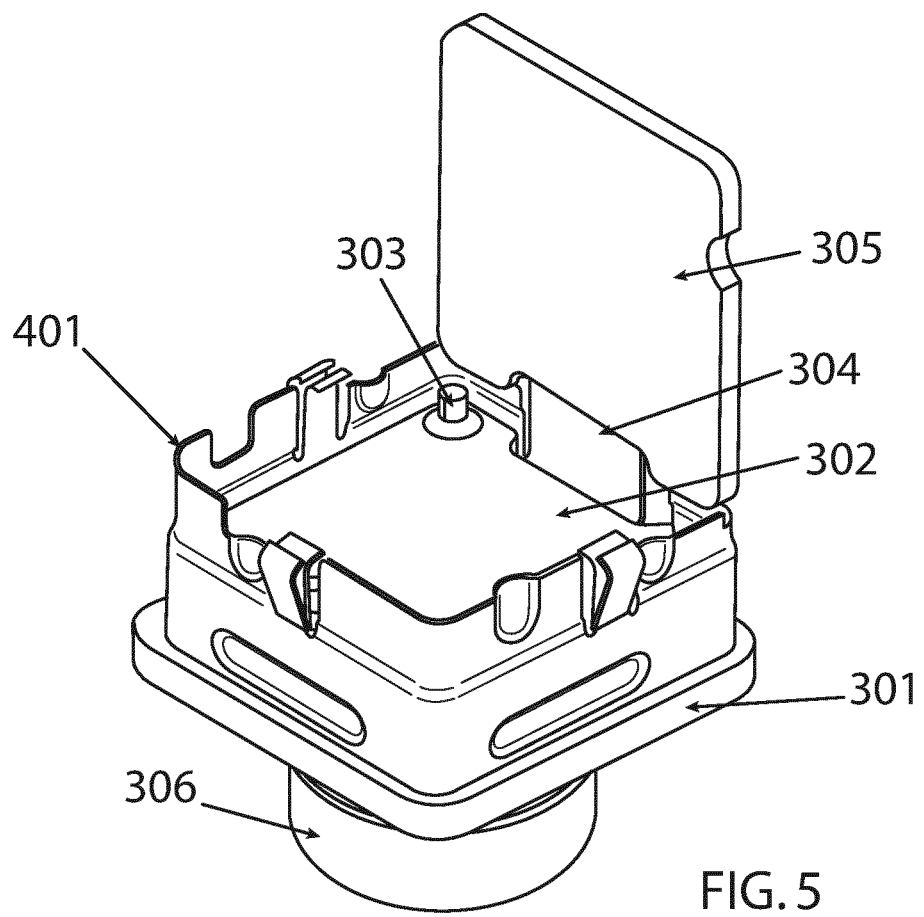
FIG. 5 exemplarily illustrates a perspective view of the second printed circuit board in the process of being folded into the printed circuit board retention cage of the internally aligned camera in accordance with some of the embodiments of the present invention.
Figure 5A:
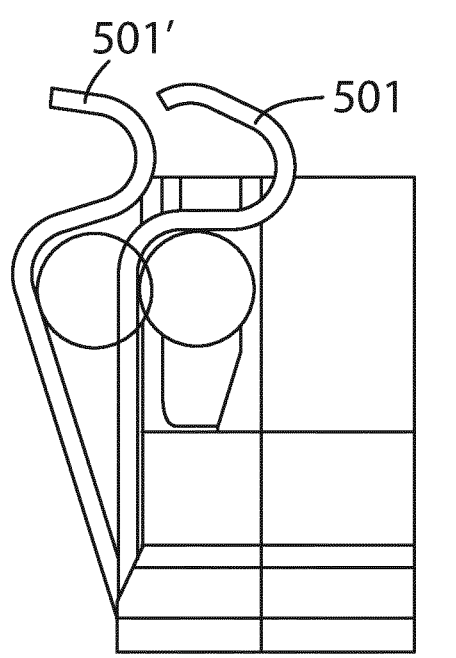
FIG. 5A exemplarily illustrates a superimposed sectional view a retaining clip in an open and in a closed position of the printed circuit board retention cage of the internally aligned camera in accordance with some of the embodiments of the present invention.

The second PCB 305 is folded over said first PCB 302 and the second PCB 305 is fastened to the PCB retention cage 401 using a second fastening means. FIG. 5 exemplarily illustrates a perspective view of the second PCB 305 in the process of being folded over into the PCB retention cage 401 of the internally aligned camera in accordance with some of the embodiments of the present invention. In an embodiment, said second fastening means comprises retaining clips 501 (as shown in FIG. 5A) on the PCB retention cage 401, wherein said retaining clips are released to prevent the second PCB 305 to spring back to the unfolded position. FIG. 5A exemplarily illustrates a superimposed sectional view a retaining clip 501 in an open position 501' and in a closed position 501 of the PCB retention cage 401 of the internally aligned camera in accordance with some of the embodiments of the present invention. In the closed position 501 the flexible PCB 304 is folded onto the hardstops of the PCB retention cage 401.

Figures 6A, 6B, 6C:
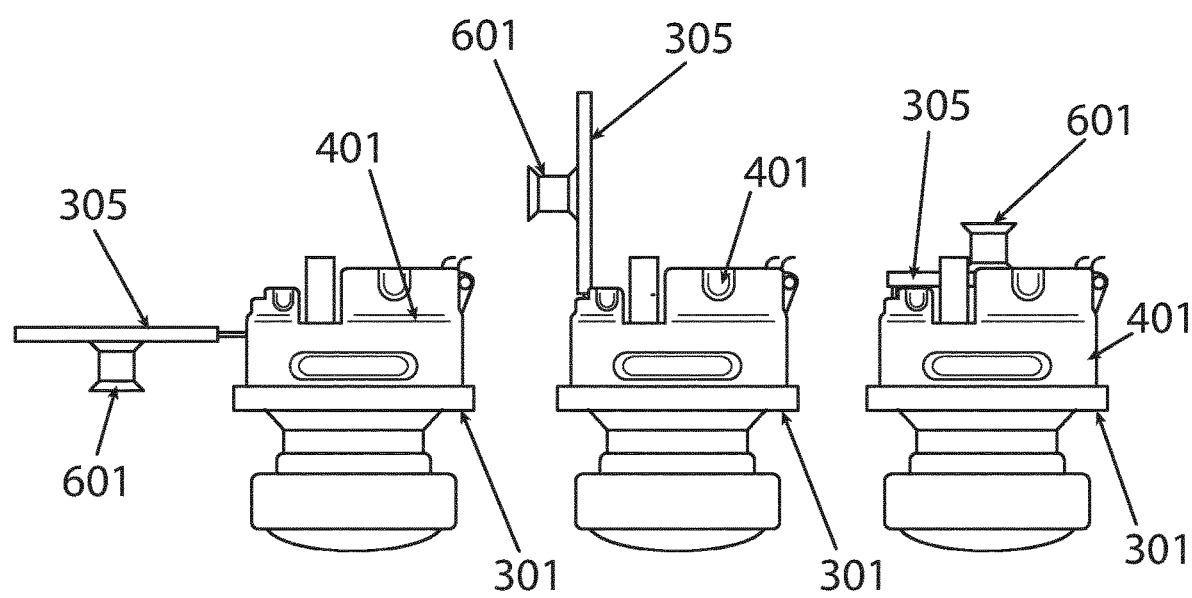
FIGS. 6A, 6B, 6C respectively exemplarily illustrates a side view of the stages involved in folding over the second printed circuit board on to the printed circuit board retention cage of the internally aligned camera in accordance with some of the embodiments of the present invention.

FIGS. 6A, 6B, and 6C respectively exemplarily illustrates a side view of the stages involved in folding over the second PCB 305 into the PCB retention cage 401 of the internally aligned camera in accordance with some of the embodiments of the present invention. As shown in FIGS. 6A, 6B and 6C, a tooling 601 enables the folding over of the second PCB 305 into the PCB retention cage 401. Where FIG. 6A shows the second PCB 305 in an unfolded position, FIG. 6C shows the second PCB 305 in a completely folded over position and FIG. 6B shows an intermediate position while the second PCB 305 is being folded over.

Figure 7:
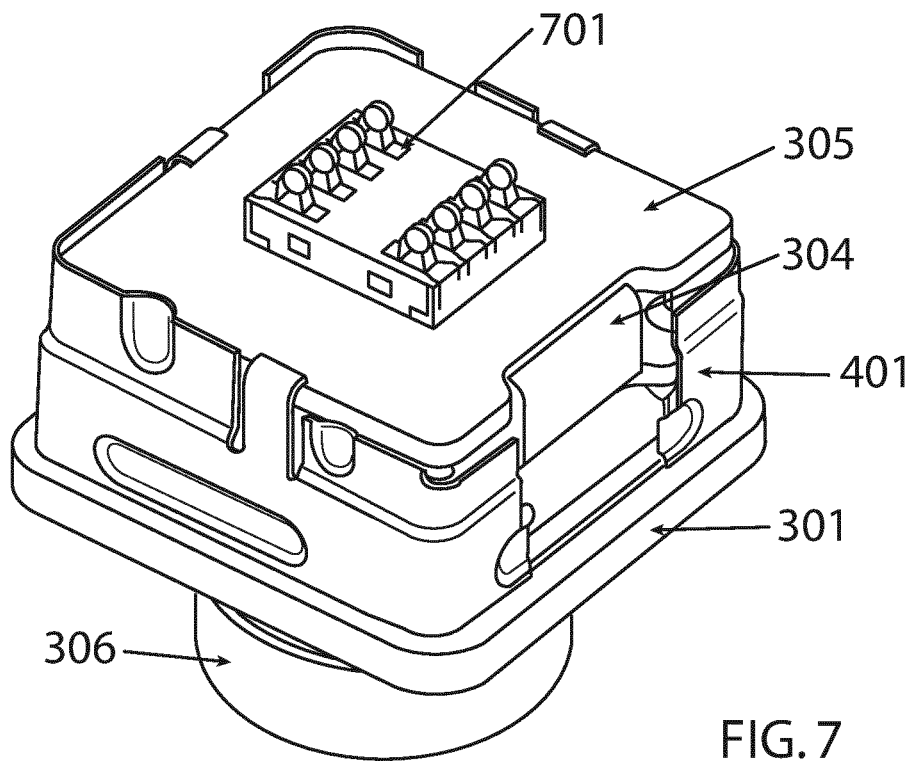
FIG. 7 exemplarily illustrates a perspective view of the second printed circuit board folded on to the printed circuit board retention cage of the internally aligned camera in accordance with some of the embodiments of the present invention.

After the second PCB 305 is folded over, a leaf spring connector 701 is soldered on said second PCB 305. FIG. 7 exemplarily illustrates a perspective view of the second PCB 305 folded on to the PCB retention cage 401 showing the leaf spring connector 701 in accordance with some of the embodiments of the present invention.

Figure 8:
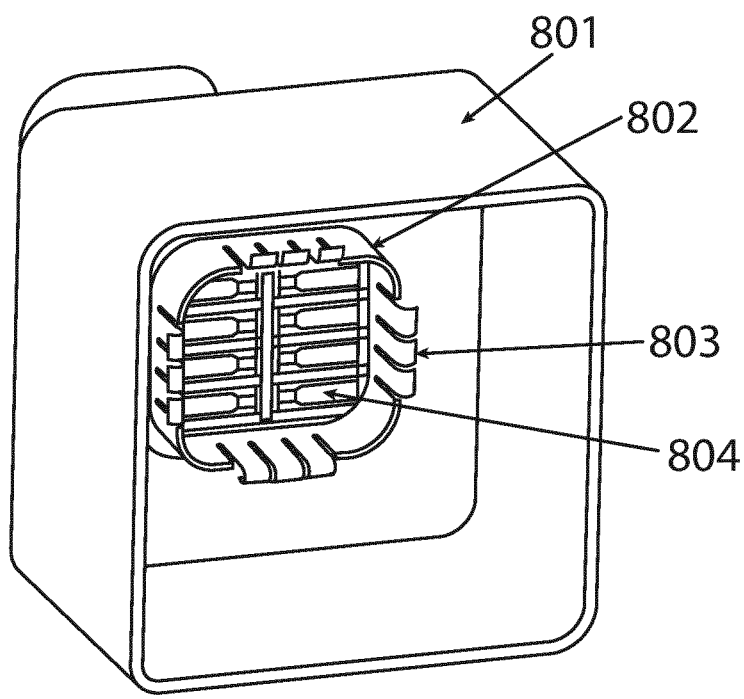
FIG. 8 exemplarily illustrates a perspective view of a rear housing assembly of the internally aligned camera in accordance with some of the embodiments of the present invention.

A rear housing assembly 801 can be assembled with said front housing assembly 301. The rear housing assembly 801 comprises contact pads 804, a metal shield 802, said metal shield comprising spring features 803. FIG. 8 exemplarily illustrates a perspective view of a rear housing assembly 801 of the internally aligned camera in accordance with some of the embodiments of the present invention.

Figure 9:
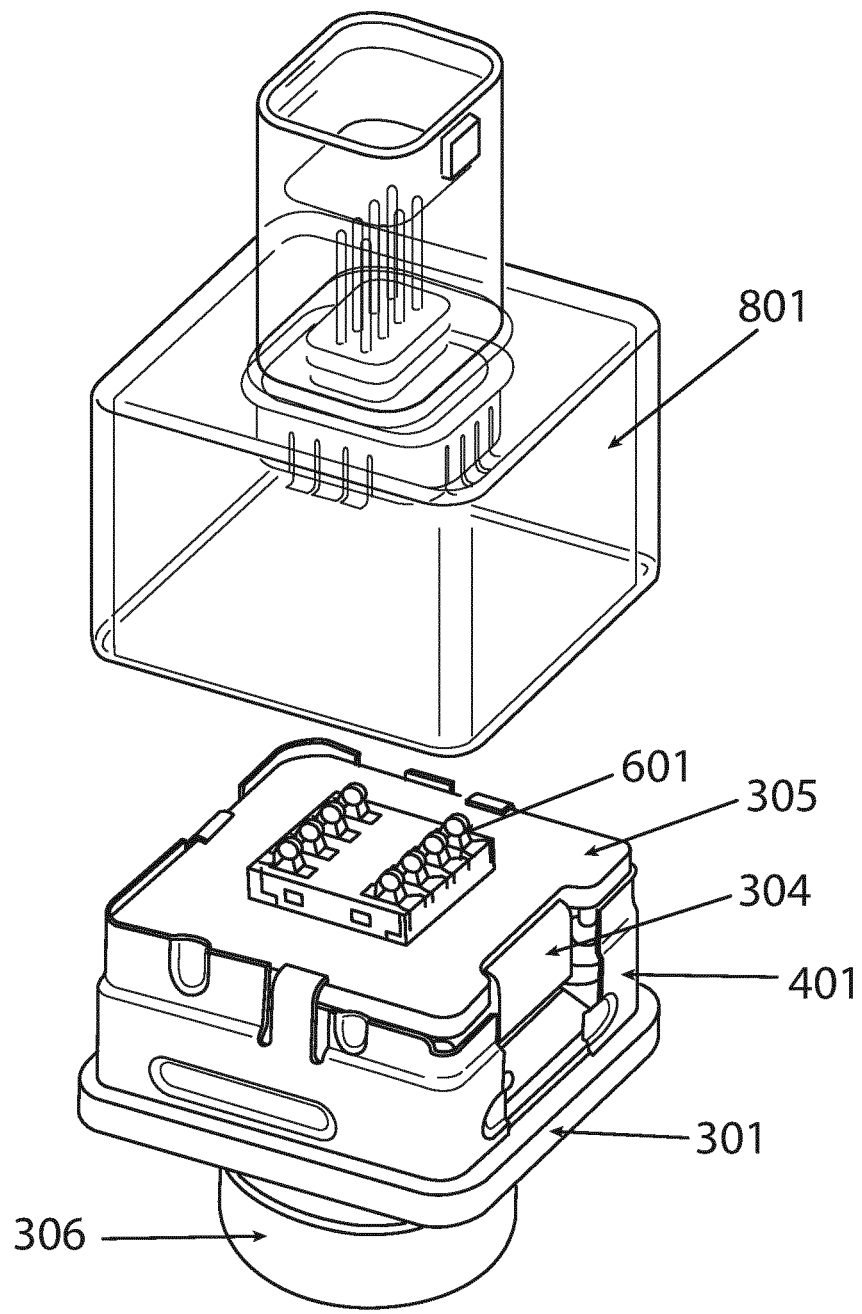
FIG. 9 exemplarily illustrates a perspective view of the rear housing assembly (transparent) being centrally aligned to the front housing assembly of the internally aligned camera in accordance with some of the embodiments of the present invention.

While assembling the rear housing assembly 801 with said front housing assembly 301, said rear housing assembly 801 is centrally aligned with said front housing assembly 301. FIG. 9 exemplarily illustrates a perspective view of the rear housing assembly 801 (transparent) being centrally aligned to the front housing assembly 301 of the internally aligned camera in accordance with some of the embodiments of the present invention.

Also, while assembling, said spring features 803 of said metal shield further clamps down said second PCB 305 and said PCB retention cage 401 in position using said spring features 803. Further, the assembling of a the rear housing assembly 801 with said front housing assembly 301 electrically couples said leaf spring connector 701 to an external connector on the rear housing assembly 801 via said contact pads 804. Further, while assembling said spring features 803 of said metal shield 802 electrically couples said second PCB 305 and said PCB retention cage 401 to said metal shield 802.

Finally, the rear housing assembly 801 is fastened with said front housing assembly 301 in said centrally aligned position using a third fastening means. In an embodiment, said third fastening means comprises laser welding the mated portions of the weld interfaces of the rear housing assembly 801 and the front housing assembly 301.

Figure 10:
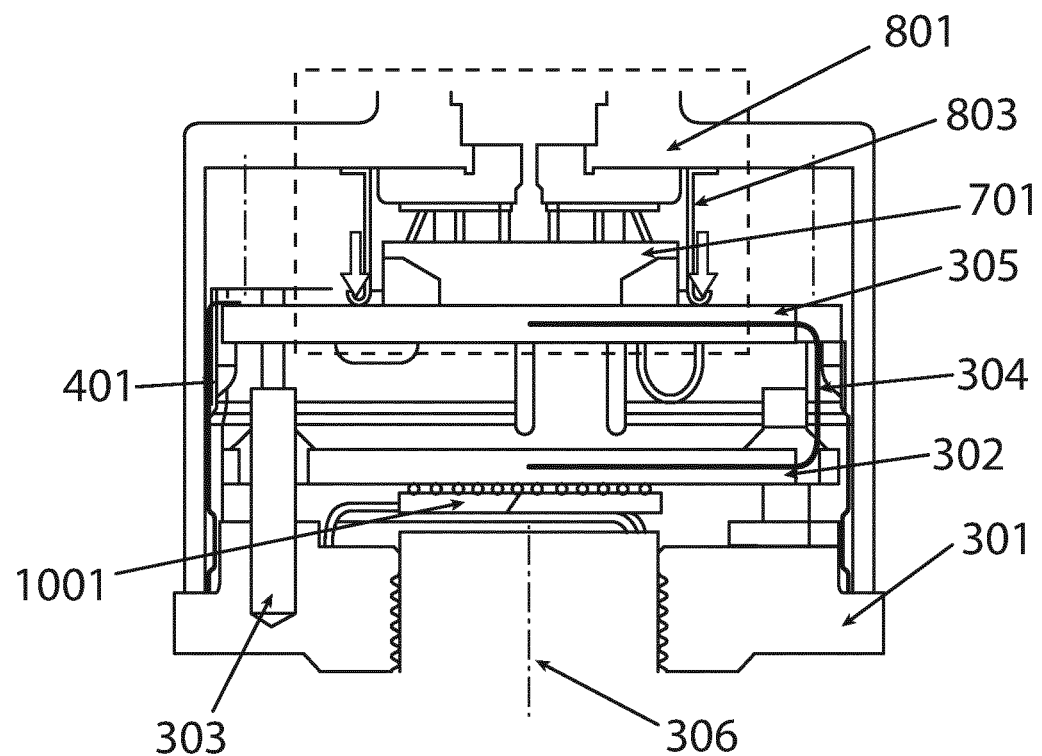
FIG. 10 exemplarily illustrates a sectional view of the fully assembled internally aligned camera in accordance with some of the embodiments of the present invention.
Figure 10A:
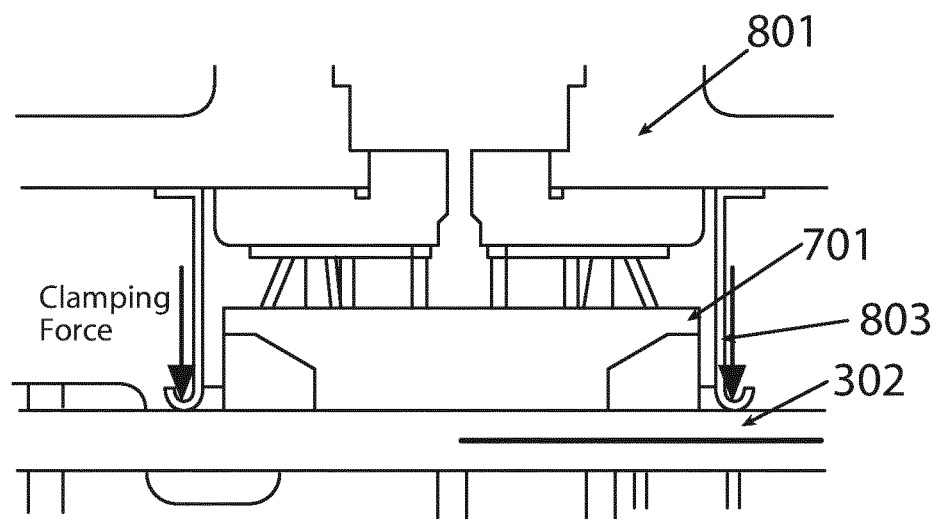
FIG. 10A exemplarily illustrates a portion (shown as broken lines in FIG. 10) of the sectional view of FIG. 10.

FIG. 10 exemplarily illustrates a sectional view of the fully assembled internally aligned camera in accordance with some of the embodiments of the present invention and FIG. 10A exemplarily illustrates a portion (shown as broken lines in FIG. 10) of the sectional view of FIG. 10.

As shown in FIG. 10, upon being fully assembled, the internally aligned camera device, comprises a front housing assembly 301, a first PCB 302, a second PCB 305 and a flexible PCB 304, a printed circuit board retention cage 401 and a rear housing assembly 801.

The front housing assembly 301 comprises lens elements for forming an image on an image sensor 1001 operably coupled to the first PCB 302, said image sensor 1001 optically aligned with said front housing assembly 301 comprising said lens elements, and said first PCB 302 is attached to said front housing assembly 301 by a first fastening means. In an embodiment, the first fastening means comprises laser soldering, where said first PCB 302 is laser soldered with one or more of solder studs 303 of said front housing assembly 301.

The second PCB 305 is electrically coupled to said first PCB 302 using a flexible PCB 304, wherein said second PCB 305 is folded over said first PCB 302. The PCB retention cage 401 retains the second PCB 305 in position using one or more retaining clips. Also, the second PCB 305 comprises a leaf spring connector 701 for electrically coupling said second PCB 305 to an external connector on the rear housing assembly 801.

The rear housing assembly 801 comprises a metal shield 802 comprising one or more spring features 803, where said one or more spring features 803 clamps down the second PCB 305 and said PCB retention cage 401 in position. As shown in FIG. 10 and FIG. 10A the spring features 803 provides a clamping force (as shown by black arrows) to further secure the second PCB 305 and said PCB retention cage 401 in position.

Further, said front housing assembly 301 is centrally aligned with said rear housing assembly 801 and where said front housing assembly 301 and said rear housing assembly 801 is attached using a second fastening means. In an embodiment, the second fastening means comprises laser welding.

In an embodiment, said spring features 803 of said metal shield 802 electrically couples said second PCB 305 and said PCB retention cage 401 to said metal shield 802. Further, the walls of said PCB retention cage 401 encloses said first PCB 302 and said second PCB 305 along the edges of said first PCB 302 and said second PCB.

Figure 11:
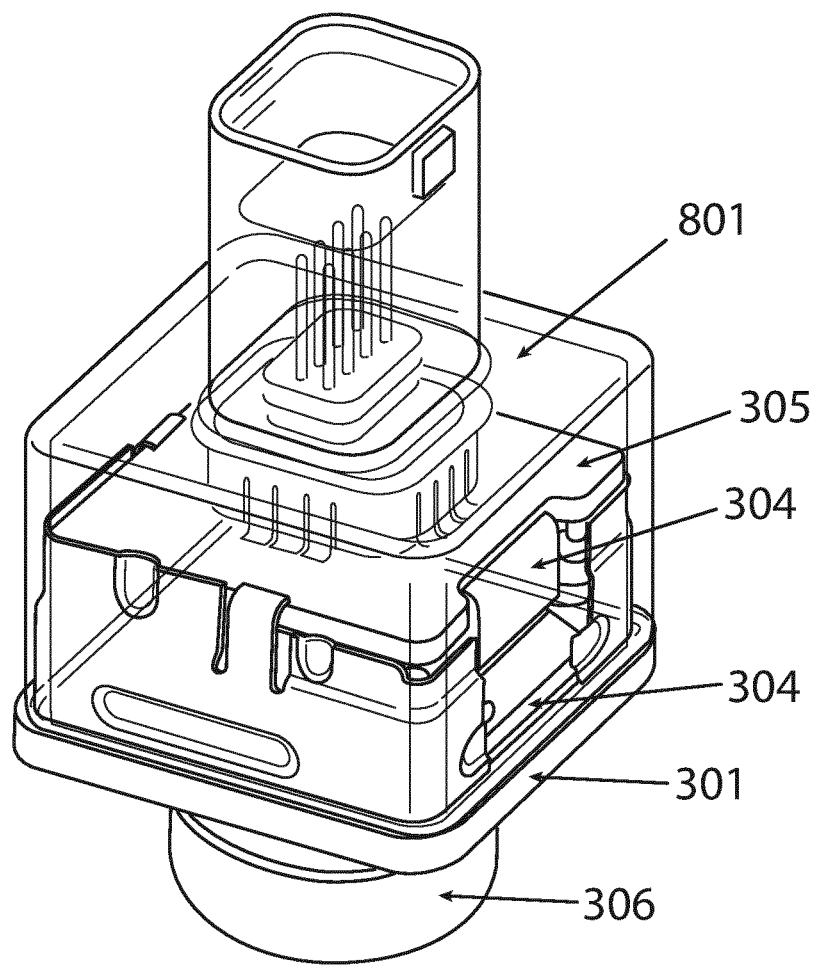
FIG. 11 exemplarily illustrates a perspective view of the fully assembled internally aligned camera (rear housing assembly is shown to be transparent) in accordance with some of the embodiments of the present invention.

FIG. 11 exemplarily illustrates a perspective view of the fully assembled internally aligned camera (rear housing assembly is shown to be transparent) in accordance with some of the embodiments of the present invention.

It will be appreciated that not only does the present invention cures the deficiency of the prior art, in addition, the Faraday's cage formed by the PCB retention cage 401 and the metal shield 802 provides electromagnetic interference shielding to the first PCB 302 and the second PCB 305.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. An internally aligned camera device for use in a vehicle, comprising:
    a front housing assembly comprising lens elements;
    a first printed circuit board comprising an image sensor, said image sensor optically aligned with said front housing assembly, said first printed circuit board attached to said front housing assembly by a first fastening means;
    a second printed circuit board electrically coupled to said first printed circuit board using a flexible printed circuit board,
    wherein said second printed circuit board folded over said first circuit board;
    a printed circuit board retention cage retaining the second printed circuit board in position using one or more retaining clips; and
    a rear housing assembly comprising a metal shield comprising one or more spring features, wherein said one or more spring features clamps down the second printed circuit board and said printed circuit board retention cage in position,
    wherein said second printed circuit board comprises a leaf spring connector for electrically coupling said second printed circuit board to an external connector on the rear housing assembly, and wherein said front housing assembly is centrally aligned with said rear housing assembly and wherein said front housing assembly and said rear housing assembly is attached using a second fastening means.

2. The device of claim 1, wherein said first fastening means comprises laser soldering said first printed circuit board with one or more solder studs of said front housing assembly.

3. The device of claim 1, wherein said second fastening means comprises laser welding.

4. The device of claim 1, wherein said spring features of said metal shield electrically couples said second printed circuit board and said printed circuit board retention cage to said metal shield.

5. The device of claim 1, wherein walls of said printed circuit board retention cage encloses said first printed circuit board and said second printed circuit board along the edges of said first printed circuit board and said second printed circuit board.

6. A method for manufacturing an internally aligned camera device, comprising:
 optically aligning an image sensor mounted on a first printed circuit board with a front housing assembly comprising lens elements, said first printed circuit board electrically coupled to a second printed circuit board through a flexible printed circuit board;
 fastening said first printed circuit board to said front housing assembly using a first fastening means to constrain said first printed circuit board after said optical alignment of said image sensor with said front housing assembly;
 placing a printed circuit board retention cage on said front housing assembly;
 folding said second printed circuit board over said first printed circuit board and fastening said second printed circuit board to said printed circuit board retention cage using a second fastening means;
 soldering a leaf spring connector on said second printed circuit board;
 assembling a rear housing assembly with said front housing assembly, said rear housing assembly comprising a metal shield, said metal shield comprising spring features wherein while assembling said spring features of said metal shield clamps down said second printed circuit board and said printed circuit board retention cage in position using said spring features and wherein while assembling said rear housing assembly is centrally aligned with said front housing assembly; and
 fastening said rear housing assembly with said front housing assembly in said centrally aligned position using a third fastening means.

7. The method of claim 6, wherein said first fastening means comprises laser soldering said first printed circuit board with one or more solder studs of said front housing assembly.

8. The method of claim 6, wherein said second fastening means comprises retaining clips on the printed circuit board retention cage, wherein said retaining clips are released to prevent the second printed circuit board to spring back to the unfolded position.

9. The method of claim 6, wherein said third fastening means comprises laser welding.

10. The method of claim 6, wherein said assembling of a rear housing assembly with said front housing assembly electrically couples said leaf spring connector to an external connector on the rear housing assembly.

11. The method of claim 6, wherein while assembling said spring features of said metal shield electrically couples said second printed circuit board and said printed circuit board retention cage to said metal shield.

12. The method of claim 6, wherein walls of said printed circuit board retention cage encloses said first printed circuit board along the edges of said first printed circuit board.

13. An internally aligned camera device for use in a vehicle, comprising:
 a front housing assembly comprising lens elements;
 a first printed circuit board comprising an image sensor, said image sensor optically aligned with said front housing assembly, said first printed circuit board attached to said front housing assembly by a first fastening means,
 wherein said first fastening means comprises laser soldering said first printed circuit board with one or more solder studs of said front housing assembly;
 a second printed circuit board electrically coupled to said first printed circuit board using a flexible printed circuit board, wherein said second printed circuit board folded over said first circuit board;
 a printed circuit board retention cage retaining the second printed circuit board in position using one or more retaining clips; and
 a rear housing assembly comprising a metal shield comprising one or more spring features, wherein said one or more spring features clamps down the second printed circuit board and said printed circuit board retention cage in position,
 wherein said front housing assembly is centrally aligned with said rear housing assembly and wherein said front housing assembly and said rear housing assembly is attached using a second fastening means.

14. The device of claim 13, wherein said second fastening means comprises laser welding.

15. The device of claim 13, wherein said second printed circuit board comprises a leaf spring connector for electrically coupling said second printed circuit board to an external connector on the rear housing assembly.

16. The device of claim 13, wherein said one or more spring features of said metal shield electrically couple said second printed circuit board and said printed circuit board retention cage to said metal shield.

17. The device of claim 13, wherein walls of said printed circuit board retention cage encloses said first printed circuit board and said second printed circuit board along the edges of said first printed circuit board and said second printed circuit board.

* * * * *